United States Patent
Zhang et al.

(10) Patent No.: US 12,294,994 B2
(45) Date of Patent: May 6, 2025

(54) TRANSMISSION CONFIGURATION INDICATION AND TRANSMISSION OCCASION MAPPING

(71) Applicant: Apple Inc., Cupertino, CA (US)

(72) Inventors: Yushu Zhang, Beijing (CN); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 604 days.

(21) Appl. No.: 17/440,589

(22) PCT Filed: Aug. 3, 2020

(86) PCT No.: PCT/CN2020/106625
§ 371 (c)(1),
(2) Date: Sep. 17, 2021

(87) PCT Pub. No.: WO2022/027192
PCT Pub. Date: Feb. 10, 2022

(65) Prior Publication Data
US 2022/0304023 A1 Sep. 22, 2022

(51) Int. Cl.
*H04W 72/1273* (2023.01)
*H04W 72/0446* (2023.01)
(Continued)

(52) U.S. Cl.
CPC ... *H04W 72/1273* (2013.01); *H04W 72/0446* (2013.01); *H04W 72/0453* (2013.01); *H04W 72/23* (2023.01)

(58) Field of Classification Search
CPC ......... H04W 72/1273; H04W 72/0446; H04W 72/0453; H04W 72/23; H04L 5/001;
(Continued)

(56) References Cited

U.S. PATENT DOCUMENTS

2019/0281587 A1   9/2019   Zhang et al.
2019/0320469 A1   10/2019   Huang et al.
(Continued)

FOREIGN PATENT DOCUMENTS

CN   110856258 A   2/2020
CN   111201741 A   5/2020
(Continued)

OTHER PUBLICATIONS

Translated Foreign Reference CN-110035511-B (Year: 2018).*
(Continued)

*Primary Examiner* — Ricardo H Castaneyra
(74) *Attorney, Agent, or Firm* — Kilpatrick Townsend & Stockton LLP

(57) ABSTRACT

The present application relates to devices and components including apparatus, systems, and methods for mapping transmission configuration indicator states to resources of physical downlink shared channel transmission occasions in wireless communication systems.

11 Claims, 13 Drawing Sheets

(51) Int. Cl.
*H04W 72/0453* (2023.01)
*H04W 72/23* (2023.01)

(58) Field of Classification Search
CPC ... H04L 5/0037; H04L 5/0044; H04L 5/0094; H04L 5/0051
USPC .......................................................... 370/329
See application file for complete search history.

(56) References Cited

U.S. PATENT DOCUMENTS

| | | | |
|---|---|---|---|
| 2020/0100225 A1 | 3/2020 | Khoshnevisan et al. | |
| 2020/0205137 A1 | 6/2020 | Khoshnevisan et al. | |
| 2021/0227526 A1* | 7/2021 | Khoshnevisan | H04L 5/0094 |
| 2022/0191892 A1* | 6/2022 | Muruganathan | H04W 72/1263 |
| 2022/0224482 A1* | 7/2022 | Kim | H04L 5/0044 |

FOREIGN PATENT DOCUMENTS

| | | | | |
|---|---|---|---|---|
| CN | 112106308 A | | 12/2020 | |
| CN | 110035511 B | * | 3/2021 | ........... H04L 5/0053 |
| WO | 2020068763 | | 4/2020 | |

OTHER PUBLICATIONS

International Patent Application No. PCT/CN2020/106625, International Preliminary Report on Patentability, Feb. 16, 2023, 5 pages.
Remaining Issues for Multi-TRP Enhancement, 3GPP TSG RAN WG1 #101, R1-2004229, 2020, 12 pages.
Summary of email thread [101-e-NR-eMIMO-multiTRP-01], 3GPP TSG RAN WG1 #101, R1-2004926, 2020, 7 pages.
International Patent Application No. PCT/CN2020/106625, International Search Report and Written Opinion, Mailed on Apr. 29, 2021, 9 pages.
3rd Generation Partnership Project; Technical Specification Group Radio Access Network; NR; Physical channels and modulation (Release 16), 3GPP TS 38.211 V16.2.0, Jun. 2020, 131 pages.
3rd Generation Partnership Project; Technical Specification Group Radio Access Network; NR; Multiplexing and channel coding (Release 16), 3GPP TS 38.212 V16.2.0, Jun. 2020, 151 pages.
3rd Generation Partnership Project; Technical Specification Group Radio Access Network; NR; Physical layer procedures for data (Release 16), 3GPP TS 38.214 V16.2.0, Jun. 2020, 164 pages.
3rd Generation Partnership Project; Technical Specification Group Radio Access Network; NR; Radio Resource Control (RRC) protocol specification (Release 16), 3GPP TS 38.331 V16.1.0, Jul. 2020, 906 pages.
3rd Generation Partnership Project; Technical Specification Group Radio Access Network; 5GS; User Equipment (UE) conformance specification; Part 3: Protocol Test Suites (Release 15), 3GPP TS 38.523-3 V15.8.0, Jun. 2020, 236 pages.
Takeda et al., Understanding the Heart of the 5G Air Interface: An Overview of Physical Downlink Control Channel for 5G New Radio (NR), IEEE Communications Standards Magazine 4, Sep. 23, 2020, pp. 22-29.
China Patent Application No. 202080104755.X, Office Action, Jun. 28, 2024, 14 pages.
Summary of Enhancements on Multi-TRP/Panel Transmission, Huawei HiSilicon, 3rd Generation Partnership Project Technical Specification Group Radio Access Network Working Group1 Meeting #98, R1-1909602, Aug. 26-30, 2019, 76 pages.
China Patent Application No. 202080104755.X, Office Action, Jan. 15, 2025, 16 pages.

* cited by examiner

600

TC1 1

Option 1
604

TC1 2

Option 2
608

TC1 1/2

Option 3
612

TRANSMISSION CONFIGURATION INDICATION AND TRANSMISSION OCCASION MAPPING

CROSS-REFERENCE TO RELATED APPLICATIONS

This application is a 371 U.S. National Phase of PCT International Patent Application No. PCT/CN2020/106625, filed on Aug. 3, 2020; the disclosure of which is incorporated by reference herein in its entirety for all purposes.

BACKGROUND

A user equipment "UE" may be connected with a network through multiple transmit/receive points "TRPs." In multi-TRP transmission, different TRPs may provide different data for spatial multiplexing or the same data to improve robustness. Multi-TRP may be supported by a single-downlink control information "DCI" mode and multi-DCI mode. In single-DCI mode, one TRP sends DCI to schedule PDSCH transmissions from more than one TRP. In multi-DCI mode, TRPs may independently schedule their own PDSCH.

DETAILED DESCRIPTION

Figure 1:
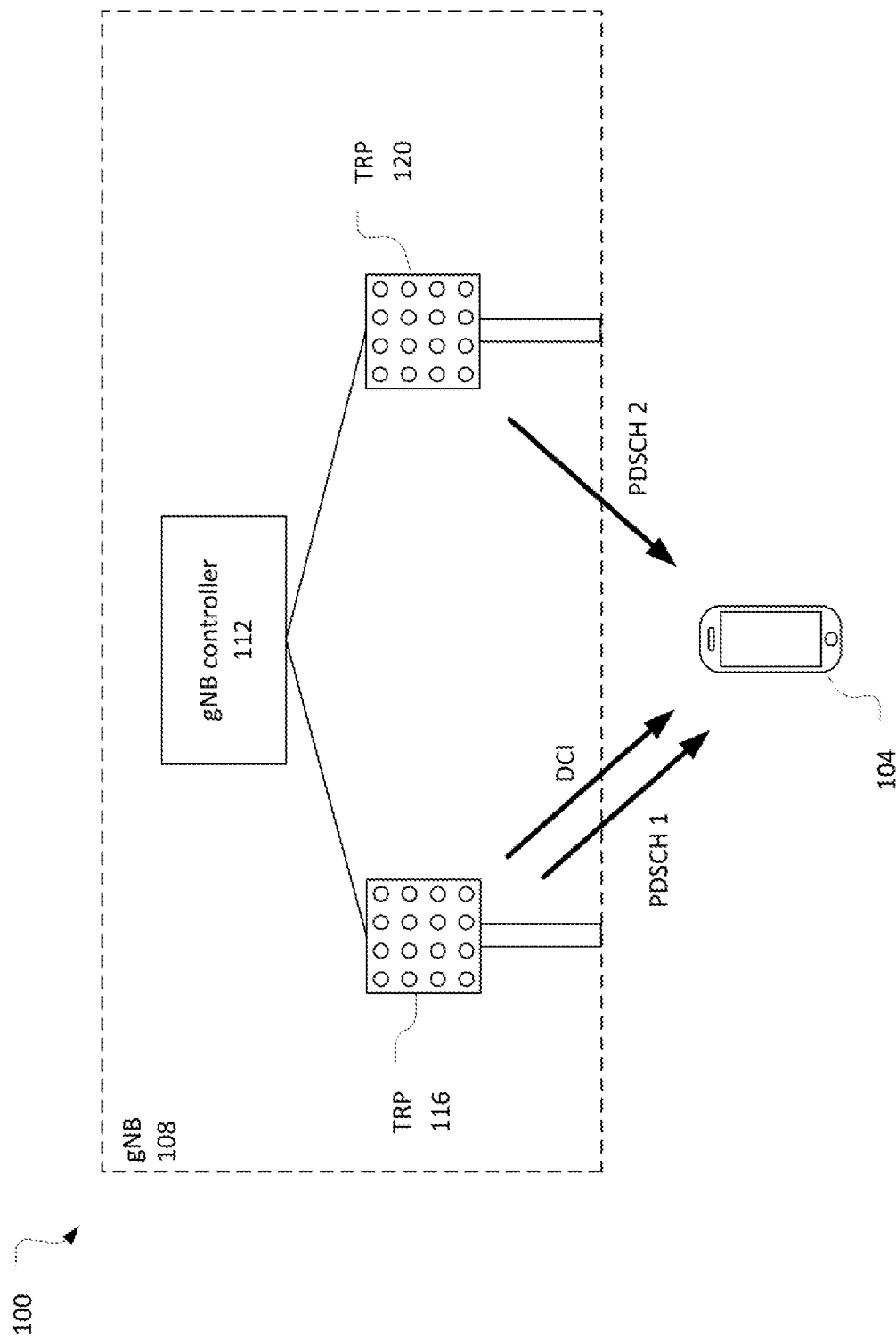
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an Application Specific Integrated Circuit "ASIC," a field-programmable device "FPD" (e.g., a field-programmable gate array "FPGA," a programmable logic device "PLD," a complex PLD "CPLD," a high-capacity PLD "HCPLD," a structured ASIC, or a programmable system-on-a-chip "SoC"), digital signal processors "DSPs," etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit "CPU," a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and a gNB 108. The gNB 108 may be a base station that provides a wireless access cell, for example, a Third Generation Partnership Project "3GPP" New Radio "NR" cell, through which the UE 104 may communicate with the gNB 108. The UE 104 and the gNB 108 may communicate over an air interface compatible with 3GPP technical specifications such as those that define Fifth Generation "5G" NR system standards.

The UE 104 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices, Internet of things "IoT" devices. In some embodiments, the UE 104 may be a reduced-capability UE, also known as an NR-light UE.

The gNB 108 may include a gNB controller 112 coupled with one or more TRPs, for example, TRP 116 and TRP 120. In general, the gNB controller 112 may perform the majority of the operations of a communication protocol stack, including scheduling, while the TRPs 116 and 120 act as distributed antennas. In some embodiments, the TRPs 116 and 120 may perform some lower-level operations of the communication protocol stack (for example, analog physical "PHY" layer operations).

The gNB 108 may use the TRPs 116 and 122 to geographically separate points at which a signal may be transmitted to, or received from, the UE 104. This may increase flexibility of using multiple-input, multiple-output and beamforming enhancements for communicating with the UE 104. The TRPs 116 and 120 may be used to transmit the same or different downlink transmissions to the UE 104. In some embodiments, the distributed transmit/receive capabilities provided by the TRPs 116 and 120 may be used for coordinated multipoint or carrier aggregation systems.

The gNB 108 may transmit information (for example, data and control signaling) in the downlink direction by mapping logical channels on the transport channels, and transport channels onto physical channels. The logical channels may transfer data between a radio link control "RLC" and media access control "MAC" layers: the transport channels may transfer data between the MAC and PHY layers; and the physical channels may transfer information across the air interface.

The physical channels may include a physical broadcast channel "PBCH"; a physical downlink control channel "PDCCH"; and a physical downlink shared channel "PDSCH."

The PBCH may be used to broadcast a master information block "MIB" to provide information to facilitate access to the NR cell. The MIB may include a system frame number, cell barred flag, and information that may be used to receive a system information block 1 "SIB1." The MIB and the SIB1 may be used to transmit minimum system information that provides a basic parameter set that the UE 104 may use for initial access or acquiring any other system information.

The PBCH may be transmitted along with physical synchronization signals "PSS" and secondary synchronization signals "SSS" in a synchronization signal "SS"/PBCH block. The SS/PBCH blocks "SSBs" may be used by the UE 104 during a cell search procedure and for beam selection.

The PDSCH may be used to transfer end-user application data, signaling radio bearer "SRB" messages, system information messages (other than, for example, MIB), and paging messages.

The PDCCH may transfer downlink control information "DCI" that is used by a scheduler of the gNB controller 112 to allocate both uplink and downlink resources. The DCI may also be used to provide uplink power control commands, configure a slot format, or indicate that preemption has occurred.

The gNB 108 may also transmit demodulation reference signals "DMRS" for the different physical channels. The DMRSs may be a sequence that is known to, or discoverable by, the UE 104. The UE 104 may compare a received version of the DMRS with the known DMRS sequence that was transmitted to estimate an impact of the propagation channel. The UE 104 may then apply an inverse of the propagation channel during a demodulation process of a corresponding physical channel transmission.

The DMRS and information from the physical channels may be mapped to resources of a resource grid. There is one resource grid for a given antenna port, subcarrier spacing configuration, and transmission direction (for example, downlink or uplink). The basic unit of an NR downlink resource grid may be a resource element, which may be defined by one subcarrier in the frequency domain and one orthogonal frequency division multiplexing "OFDM" symbol in the time domain. Twelve consecutive subcarriers in the frequency domain may compose a resource block. A resource element group "REG" may include one resource block and one OFDM symbol in the time domain, for example, 12 resource elements. A control channel element "CCE" may represent a group of resources used to transmit PDCCH. One CCE may be mapped to a number of REGs, for example, six REGs.

In single-DCI mode, DCI transmitted by a single TRP, for example, TRP 116, may schedule PDSCH transmissions from a plurality of TRPs, for example TRP 116 and TRP 120. The DCI may schedule a PDSCH transmission by indicating a PDSCH transmission occasion in which the PDSCH may be transmitted. As shown in FIG. 1, TRP 116 is to transmit a first PDSCH transmission "PDSCH 1," and TRP 120 is to transmit a second PDSCH transmission "PDSCH 2" in respective PDSCH transmission occasions. In various embodiments, PDSCH 1 and PDSCH 2 may include the same or different information.

Transmissions that use different antenna ports may experience different radio channels. However, in some situations, different antenna ports may share common radio channel characteristics. For example, different antenna ports may have similar Doppler shifts, Doppler spreads, average delay, delay spread, or spatial receive parameters (for example, properties associated with a downlink received signal angle of arrival at a UE). Antenna ports that share one or more of these large-scale radio channel characteristics may be said to be quasi co-located "QCL" with one another. 3GPP has specified four types of QCL to indicate which particular channel characteristics are shared. In QCL Type A, antenna ports share Doppler shift, Doppler spread, average delay, and delay spread. In QCL Type B, antenna ports share Doppler shift and Doppler spread are shared. In QCL Type C, antenna ports share Doppler shift and average delay. In QCL Type D, antenna ports share spatial receiver parameters.

The gNB 108 may provide transmission configuration indicator "TCI" state information to the UE 104 to indicate QCL relationships between antenna ports used for reference signals (for example, synchronization signal/PBCH or channel state information-reference signal "CSI-RS") and downlink data or control signaling, for example, PDSCH or PDCCH. The gNB 108 may use a combination of RRC signaling, MAC control element signaling, and DCI, to inform the UE 104 of these QCL relationships.

Initially, the gNB 108 may configure the UE 104 with a plurality of TCI states through RRC signaling. In some embodiments, up to 128 TCI states may be configured for PDSCH through, for example, a PDSCH-config information element, and up to 64 TCI states may be configured for PDCCH through, for example, a PDCCH-config information element. Each TCI state may include a cell identifier, a bandwidth part identifier, an indication of the relevant SS/PBCH block or CSI-RS, and an indication of the QCL type. The TC states may be set as inactive after initial configuration.

The gNB 108 may then transmit an activation command through, for example, a MAC control element. The activation command may activate up to eight combinations of one or two TCI states that correspond to eight codepoints of a TCI field in DCI. One or more specific TCI states may then be dynamically selected and signaled using the TCI field in DCI to indicate which of the active TCI states are applicable to a PDSCH resource allocation.

Figure 2:
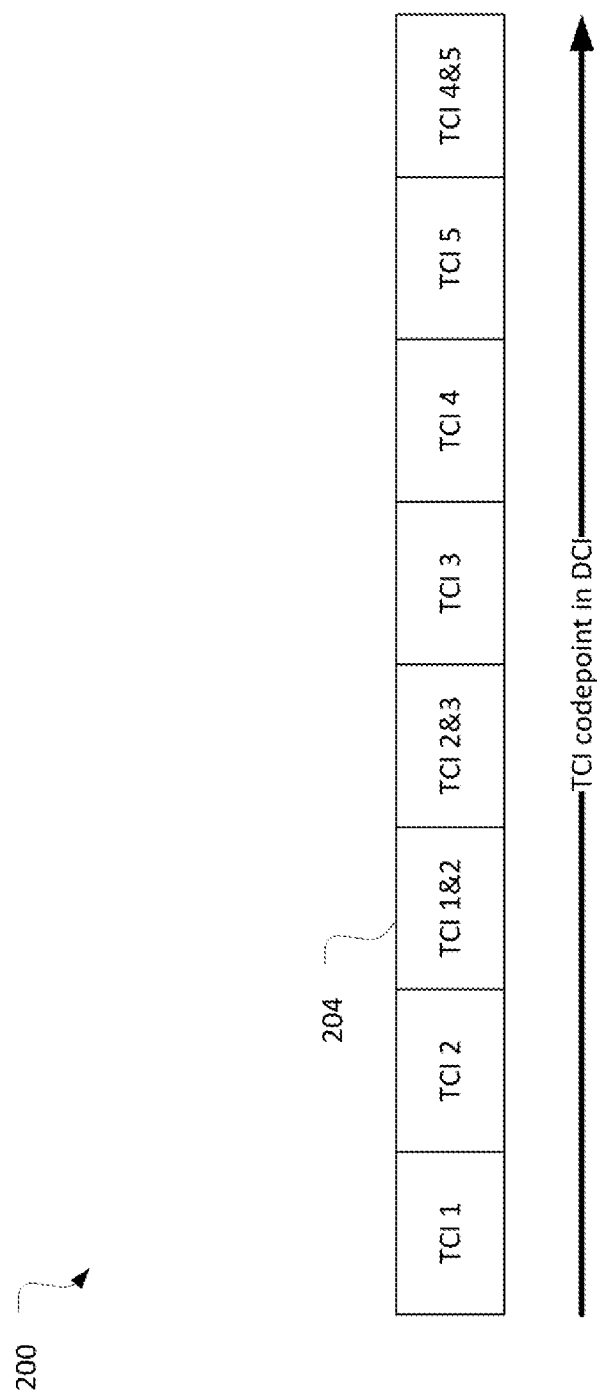
FIG. 2 illustrates transmission configuration indicator codepoints in accordance with some embodiments.

FIG. 2 illustrates TCI codepoints 200 in accordance with some embodiments. The TCI codepoints 200 may include eight codepoints that may be signaled by three bits in the TC field of the DCI. Each of the codepoints may include one or two TCI states.

For multi-TRP operation using single DCI-mode, the UE 104 may need to select a default PDSCH TCI state from the activated combinations in some scenarios. For example, if the UE 104 supports receive beamforming and a scheduling offset between a PDCCH and a PDSCH is below a threshold, the UE 104 may not have sufficient time to receive and process the DCI to determine the selected TC state. Thus, the UE 104 (and, therefore, the gNB 108) may need to proceed based on default assumptions of TCI state for the PDSCH. In various embodiments, the scheduling offset may be determined based on the last symbol of the scheduling DCI and a first symbol of the scheduled PDSCH.

In some embodiments, a default PDSCH TCI state may be applied when both of the following conditions are true: (1) one of the TC states configured by RRC includes a QCL Type D (spatial receive parameters), which may imply that the UE 104 supports receive beamforming; and (2) a scheduling offset between a PDCCH and a PDSCH is below a threshold reported by the UE 104. The UE 104 may report the threshold in a UE capability report provided to the gNB 108.

In some embodiments, the gNB 108 may enable two default TCI states for the UE 104 by transmitting such an indication in an RRC parameter, enableTwoDefaultTCIStates. This RRC parameter may be part of a serving cell configuration information element that is used to configure (add or modify) the UE 104 with a serving cell. The UE 104 may then select codepoint 204, which is the lowest TCI codepoint among the TCI codepoints 200 that include two different TCI states in an active bandwidth part.

If the serving cell configuration does not enable two default TCI states, the UE 104 may use a TC state or QCL assumption for a control resource set "CORESET" of the active bandwidth part (or the CORESET having a lowest identifier in a latest slot in the active bandwidth part if more than one CORESETs are configured).

For the single-DCI mode, the gNB 108 may schedule PDSCH transmission occasions for PDSCH 1 and PDSCH 2 using different multiplexing techniques. In a first example, frequency division multiplexing "FDM" may be used by providing different resource block group "RBG" sets for different PDSCH transmission occasions. In a second example, spatial division multiplexing "SDM" may be used by providing different DMRS code division multiplex "CDM groups" for the different PDSCH transmission occasions.

Figure 3:
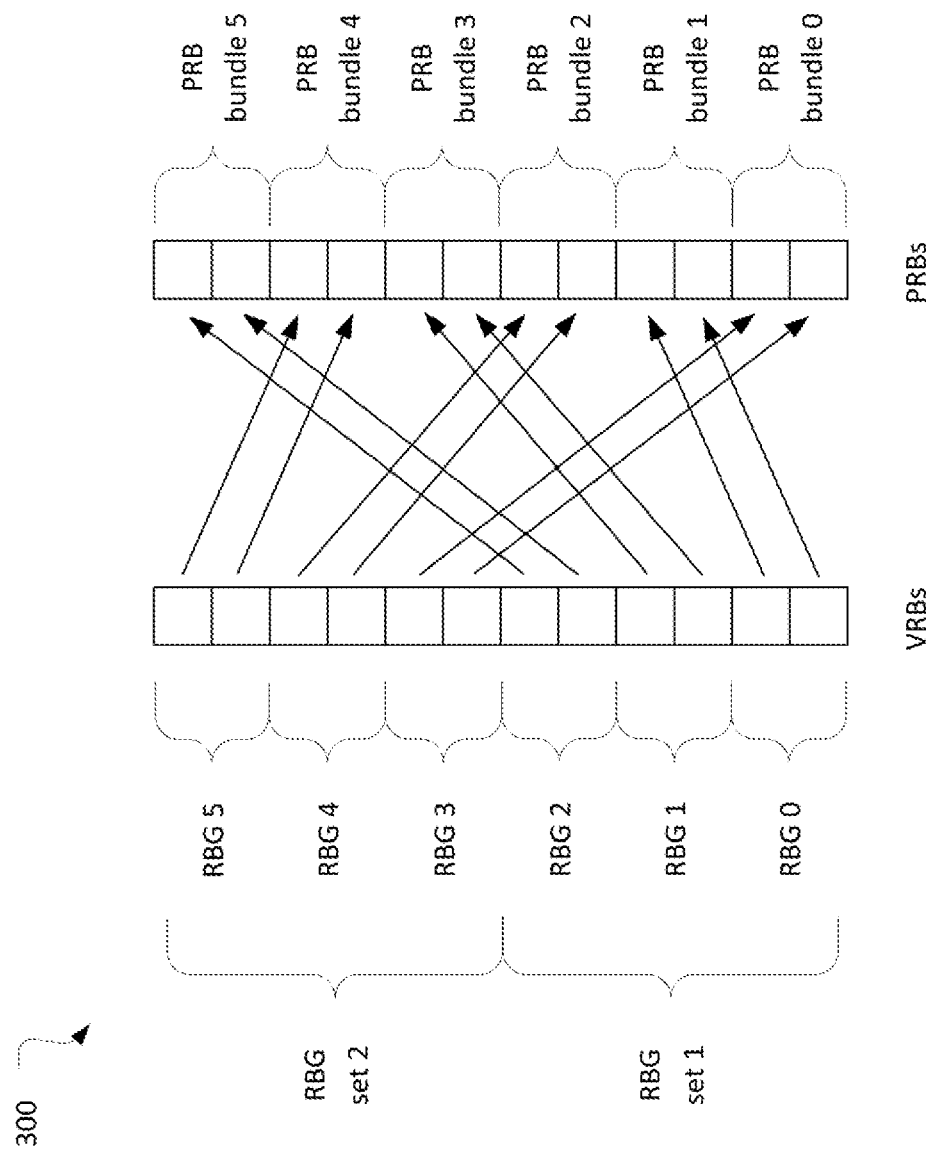
FIG. 3 illustrates communication resources in accordance with some embodiments.

FIG. 3 illustrates communication resources 300 in accordance with some embodiments. The communication resources 300 illustrate virtual resource blocks "VRBs" that may carry data of the PDSCH and related DMRS signals. The VRBs may be divided into six RBGs, RBGs 0-5, for allocation of PDSCH. The gNB 108 may multiplex the PDSCH transmissions by establishing RBG sets that include one or more RBGs. For example, RBG set 1 may include RBGs 0-2, while RBG set 2 may include RBGs 3-5. RBG set 1 may be used for transmission occasions for PDSCH 1 from TRP 116. RBG set 2 may be used for transmission occasions for PDSCH 2 from TRP 120.

The VRBs may be mapped to PRBs in a one-to-one manner. Similarly, the RBGs may be mapped to PRB bundles in a one-to-one manner. As shown, the RBGs of the first RBG set may be mapped to odd PRB bundles while RBGs of the second RBG set are mapped to even bundles. For example, RBG 0 is mapped to PRB bundle 1; RBG 1 is mapped to PRB bundle 3; RBG 2 is mapped to PRB bundle 5; RBG 3 is mapped to PRB bundle 0; RBG 4 is mapped to PRB bundle 2; and RBG 5 is mapped to PRB bundle 4.

Each of the PRB bundles may be transmitted with a separate pre-coding weight and, therefore, a PRB bundle may also be referred to as a precoding resource block group "PRG." The UE 104 may assume that all resource blocks within a PRB bundle experience a similar propagation channel and may use DMRS from the PRBs in the bundle to generate a single channel estimate.

Figure 4:
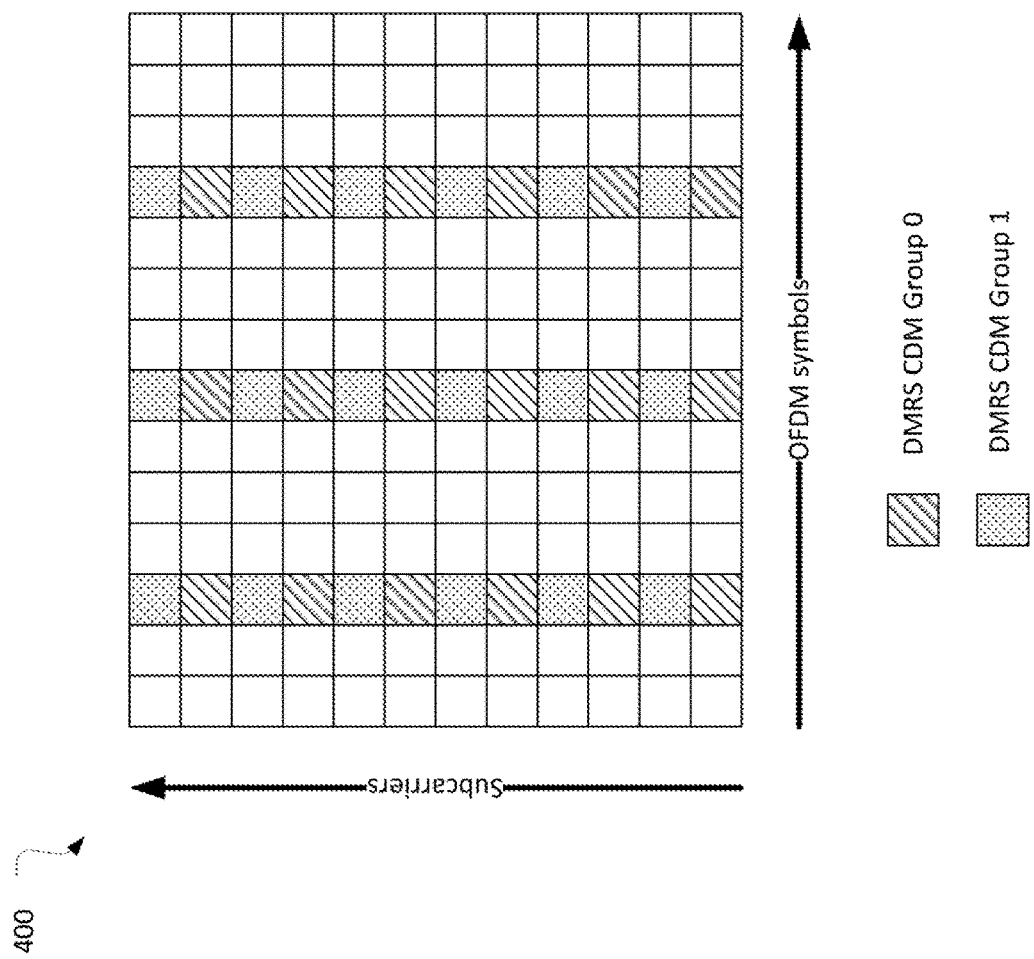
FIG. 4 illustrates a resource block in accordance with some embodiments.

FIG. 4 illustrates a resource block 400 in accordance with some embodiments. In some embodiments, the gNB 108 may use different CDM groups without data to shift the resource elements of the resource block that are used to carry the DMRS. For example, the resource block 400 provides example positions of a DMRS, for a given parameter set, with CDM group 0 and CDM group 1.

A CDM group may be considered a group of DMRS ports that share the same time and frequency locations. The UE 104 may assume that a PDSCH DMRS within a same CDM group are quasi-co-located with respect to Doppler shift, Doppler spread, average delay, delay spread, and spatial receive parameters. See, for example, 3GPP TS 38.211 v16.2.0, Section 7.4.1.1.2 (2020 June)

In various embodiments, the number of CDM groups without data may be determined by an antenna port configuration provided in DCI. See, for example, 3GPP TS 38.212 v16.2.0 Section 7.3.1.2 (2020 June). In some embodiments, the maximum number of CDM groups without data may depend on a DMRS configuration type, with DMRS configuration type 1 having up to two CDM groups and DMRS configuration type 2 having up to three CDM groups. The gNB 108 may multiplex the PDSCH transmissions by using a first CDM group, for example, CDM group 0, for PDSCH 1 from TRP 116 and a second CDM group, for example, CDM group 1, for transmission occasions for PDSCH 2 from TRP 120. In some embodiments, as explained with respect to FIG. 6, for example, one CDM group may be used for transmission occasions for both PDSCH transmissions.

Embodiments of the present disclosure describe various mapping of default PDSCH TCIs and PDSCH transmission occasions when utilizing RBG sets to provide FDM or CDM groups to provide SDM.

Figure 5:
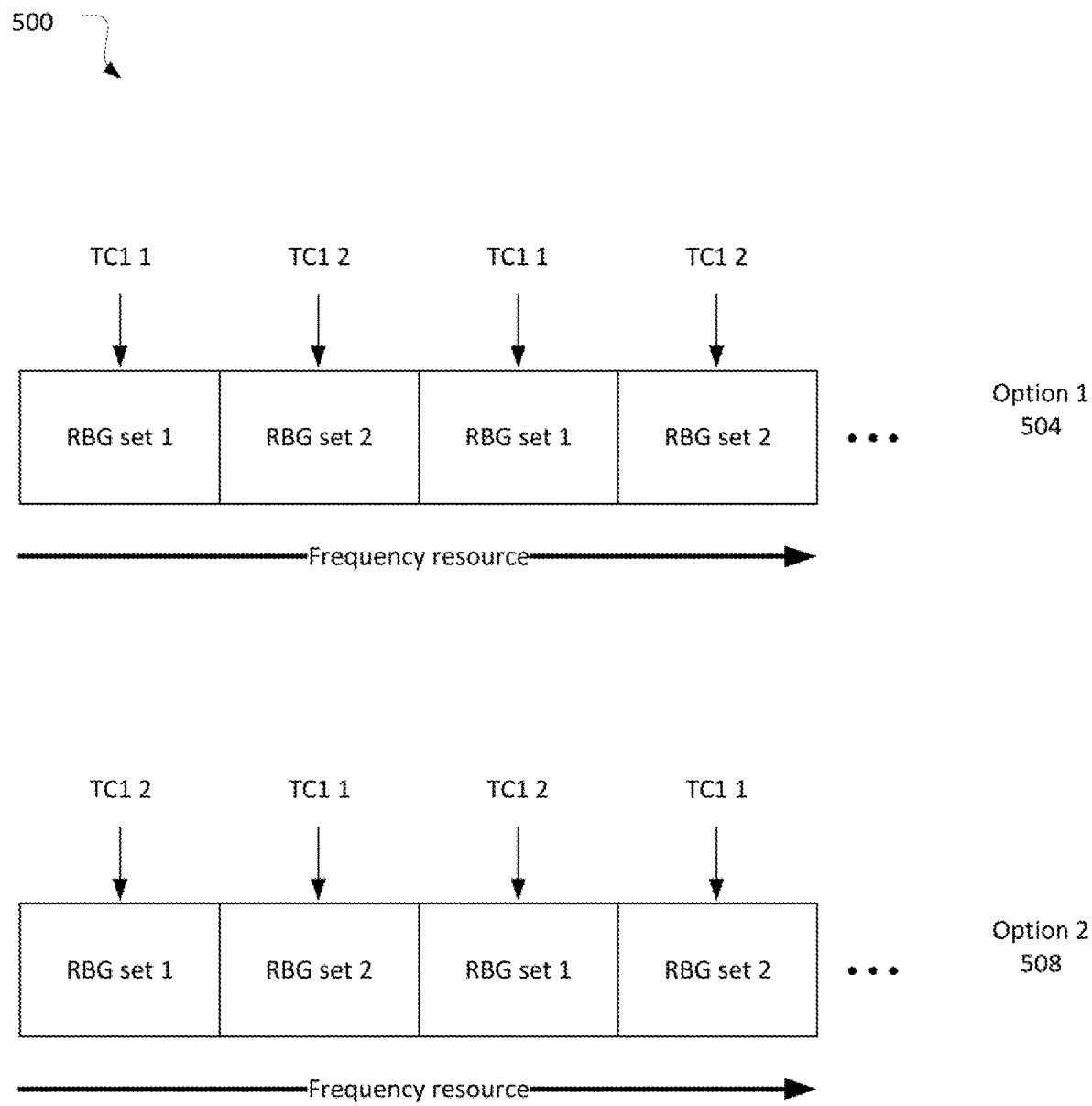
FIG. 5 illustrates mapping options in accordance with some embodiments.

FIG. 5 illustrates mapping options 500 in accordance with some embodiments. The mapping options 500 may be used for mapping two default TCI states to different RBG sets in an FDM scheme. For purposes of the present discussion, the two default TCI states may be considered to be those given above with respect to FIG. 2. That is, TCI 1 and TC 2.

The mapping options 500 may be used in the context of an FDM scheme in which a first RBG set, for example RBG set 1, is used for PDSCH occasions for PDSCH 1, and a second RBG set, for example, RBG set 2, is used for PDSCH occasions for PDSCH 2. In some embodiments, the first RBG set may include RBGs having even indices, while the second RBG set may include RBGs having odd indices. However, in other embodiments, the RBGs may be distributed among the RBG sets in another manner.

The mapping options 500 may include a first mapping option "option 1" 504 that maps the first TCI state to the first RBG set and the second TCI state to the second RBG set. Thus, the option 1 504 may map TCI 1 to RBG set 1 and TC 2 to RBG set 2.

Using option 1 504, the UE 104 may use TC to receive PDSCH 1 from TRP 116 and TCI 2 to receive PDSCH 2 from TRP 120. In particular, the UE 104 may determine that PDSCH 1 is QCL with a reference signal as indicated in TCI state 1; and may determine that PDSCH 2 is QCL with a reference signal as indicated in TC state 2.

In some embodiments, the gNB 108 may utilize the default TCI state assumptions in the transmission of the different PDSCHs. For example, the gNB 108 may transmit PDSCH 1 from TRP 116 in manner that makes the QCL parameters of TC 1 accurate with respect to PDSCH 1. Similarly, the gNB 108 may transmit PDSCH 2 from TRP 120 in a manner that makes the QCL parameters of TC 2 accurate with respect to PDSCH 2.

The mapping options 500 may also include a second mapping option "option 2" 508 that maps the second TCI state to the first RBG set and the first TCI state to the second RBG set. Thus, the option 2 508 may map TCI 2 to RBG set 1 and TCI 1 to RBG set 2.

Using this option, the UE 104 may use TCI 2 to receive PDSCH 1 from TRP 116 and TC 1 to receive PDSCH 2 from TRP 120. In particular, the UE 104 may determine that PDSCH 1 is QCL with a reference signal as indicated in TCI state 2; and may determine that PDSCH 2 is QCL with a reference signal as indicated in TCI state 1.

In some embodiments, the mapping option 1 504 and mapping option 2 508 may be considered alternative options that may be used by the UE 104. Whether to use option 1 504 or option 2 508 may be signaled or otherwise determined by the UE 104 based on various conditions.

For example, in one embodiment, the gNB 108 may signal the use of option 1 504 or option 2 508 by transmitting a mapping indication using RRC signal or MAC signaling (for example, a MAC CE). This mapping indication may indicate which option to use as a default option or until a subsequent signaling of another updated default option.

In another example, the UE 104 may determine whether to use option 504 or 508 based on an index of a resource (for example, slot, subframe, or frame) used for a reference transmission. The reference transmission may be, for example, the PDCCH that schedules the PDSCH or the scheduled PDSCH itself. For example, if the index of the resource is odd, the UE 104 may use option 1 504 and if the index of the resource is even, the UE 104 may use option 508. Other embodiments may use other configurations based on, for example, other resource properties or other reference transmissions.

In yet another example, the gNB 108 may provide an indication of whether to use option 1 504 or option 2 508 using DCI that schedules the PDSCH. The indication may be transmitted in the DCI through an existing field, a new field, or based on conditions surrounding the transmission of the DCI itself.

In some embodiments, the indication may be transmitted through an existing field of the DCI. For example, the TCI indication field in DCI that selects one of the codepoints of the activated TCI states/combinations may be used. For example, if the TCI indication field includes an even value, it may indicate that the UE 14 is to use the option 1 504, and, if the TCI indication field includes an odd value, it may indicate that the UE 104 is to use the option 2 508. Other embodiments may include other correlations between the values of the TCI indication field and the mapping options.

In some embodiments, the indication may be provided by including a new field in the DCI. For example, the DCI may include a TCI-to-PRG mapping field that provides an explicit indication of whether to use option 1 504 or option 2 508.

In still other embodiments, the indication may be based on conditions surrounding the transmission of the DCI itself. For example, an indication of the mapping option may be provided by an index of a starting CCE used to carry the DCI. For example, if the starting CCE index is even, it may indicate that the UE 104 is to use the option 1 504, and, if the CCE index is odd, it may indicate that the UE 104 is to use the option 2 508. Other embodiments may include other correlations between the starting CCE index and the mapping options.

Figure 6:
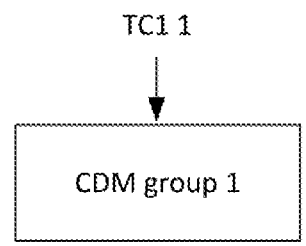
FIG. 6 illustrates mapping options in accordance with some embodiments.
Figure 6:
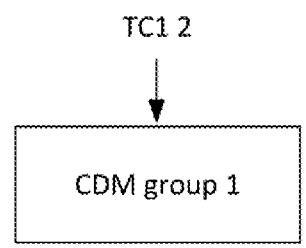
Figure 6:
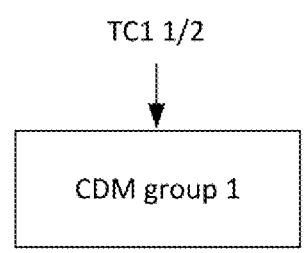
Figure 7:
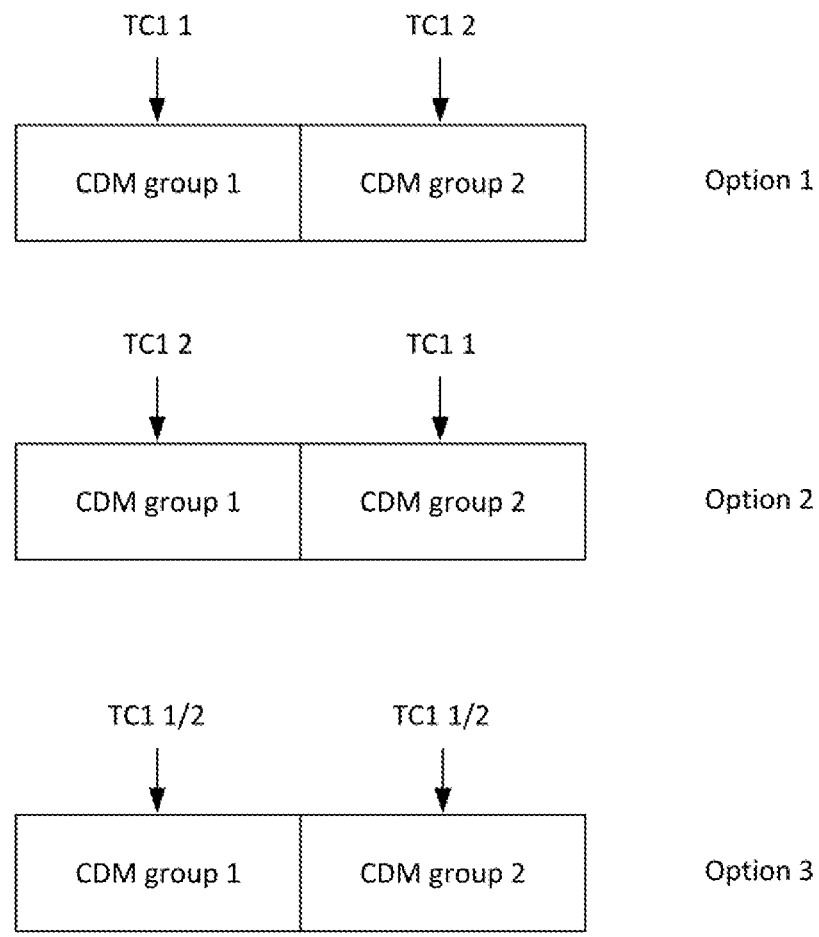
FIG. 7 illustrates mapping options in accordance with some embodiments.
Figure 8:
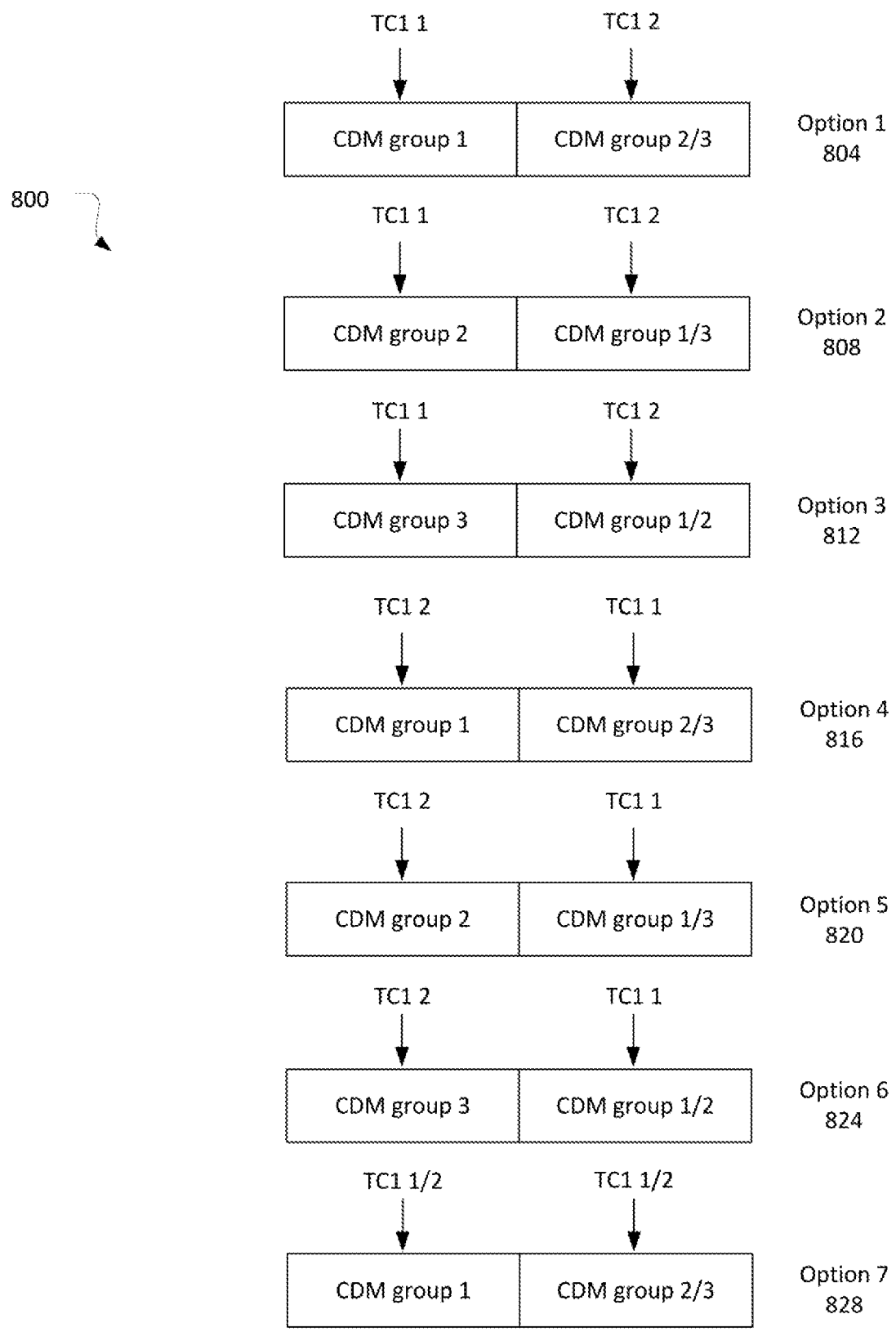
FIG. 8 illustrates mapping options in accordance with some embodiments.

FIGS. 6-8 illustrate various mapping options for mapping two default TCI states to different CDM groups in an SDM scheme in accordance with some embodiments. For purposes of the present discussion, the two default TCI states may be considered to be those given above with respect to FIG. 2. That is, TCI 1 and TC 2.

FIG. 6 illustrates mapping options 600 in accordance with some embodiments. The mapping options 600 may be used in a scenario in which one CDM group "CDM group 1" is indicated. In these embodiments, both PDSCH 1 and PDSCH 2 may use CDM group 1, or the UE 104 may assume that there is only one PDSCH (for example, PDSCH 1 and PDSCH 2 are the same transmission).

The mapping options 600 may include a first mapping option "option 1" 604 in which TCI 1 is mapped to the CDM group 1; a second mapping option "option 2" 608 in which TCI 2 is mapped to the CDM group 1; and a third mapping option "option 3" 612 in which TCI 1 and 2 are mapped to the CDM group 1.

When mapping two TCI states to one CDM group, as described in option 3 612, it may be considered that the DMRS of the PDSCH is QCL with a combined signal from both TC states. For example, if the TCI 1 indicates that QCL type A for SS/PBCH and TCI 2 indicates QCL Type B for SS/PBCH, the UE 104 may determine that the DMRS of the PDSCH shares both QCL Type A and Type B channel characteristics with the SS/PBCH. This may be similar, in some respects, to transmissions in a single frequency network "SFN" mode in which several transmitters simultaneously send the same signal over the same frequency channel.

In some embodiments, an option other than those listed above may be considered an error case.

FIG. 7 illustrates mapping options 700 in accordance with some embodiments. The mapping options 700 may be used in a scenario in which two CDM groups are indicated, for example, CDM group 1 and CDM group 2. In some embodiments, the CDM group 1 may be used for PDSCH 1 and CDM group 2 may be used for PDSCH 2.

The mapping options 700 may include a first mapping option "option 1" 704 in which TCI 1 is mapped to the CDM group 1 and TCI 2 is mapped to CDM group 2; a second mapping option "option 2" 708 in which TCI 2 is mapped to CDM group 1 and TCI 1 is mapped to CDM group 2; and a third mapping option "option 3" 712 in which TCIs 1 and 2 are mapped to both CDM groups 1 and 2.

In some embodiments, an option other than those listed above may be considered an error case.

FIG. 8 illustrates mapping options 800 in accordance with some embodiments. The mapping options 800 may be used in a scenario in which three CDM groups are indicated, for example, CDM group 1, CDM group 2, and CDM group 3.

The mapping options 800 may include a first mapping option "option 1" 804 in which TCI 1 is mapped to the CDM group 1 and TCI 2 is mapped to the other CDM group (for example, either CDM group 2 or 3); a second mapping option "option 2" 808 in which TCI 1 is mapped to CDM group 2 and TC 2 is mapped to the other CDM group (for example, either CDM group 1 or 3); a third mapping option "option 3" 812 in which TCI 1 is mapped to CDM group 3 and TCI 2 is mapped to the other CDM group (for example, CDM group 1 or 2); a fourth mapping option "option 4" 816 in which TCI 2 is mapped to CDM group 1 and TCI 1 is mapped to the other CDM group (for example, either CDM group 2 or 3); a fifth mapping option "option 5" 820 in which TCI 2 is mapped to CDM group 2 and TCI 1 is mapped to the other CDM group (for example, either CDM group 1 or 3); a sixth mapping option "option 6" 824 in which TCI 2 is mapped to CDM group 3 and TCI 1 is mapped to the other CDM group (for example, either CDM group 1 or 2); and a seventh mapping option "option 7" 828 in which TCIs 1 and 2 are mapped to the CDM group 1 and TCIs 1 and 2 are also mapped to the other CDM group (for example, either CDM group 2 or 3).

In some embodiments, an option other than those listed above may be considered an error case.

In various embodiments, any of a number of control signaling or other mechanisms may be used to select one mapping option from the mapping options 600, 700, or 800 (depending on whether one, two, or three CDM groups are indicated). Some examples are provided below.

In a first example, the gNB 108 may signal which option to use through higher-layer signaling such as, but not limited to, RRC or MAC signaling (for example, a MAC CE). A default option, for example option 1 (604, 704, or 804), may be assumed until the UE 104 receives a different indication through the higher-layer signaling.

In a second example, one of the options may be predefined. For example, a UE may be preconfigured or otherwise preprogrammed with an indication of which mapping option of the mapping options 600, 700, or 800 is to be used.

In a third example, the TCI field in DCI may be used to indicate an option selected from the mapping options 600, 700, or 800. Similar to that described above with respect to FIG. 5, an even value of the TCI field may correspond to one option, while an odd value corresponds to another.

In a fourth example, the mapping option to use may be determined based on both DCI and RRC signaling. For example, RRC signaling may configure the UE to either apply one TCI state or two TCI states. In the event RRC signaling configured the UE to apply one TCI state, one or more bits in the DCI may be used to indicate that the UE 104 is to use option 1 or option 2 for mapping options 600 and 700; or one of options 1-6 for mapping options 800. The bits of the DCI used may be implicitly signaled by using existing field, for example, TCI field, or explicitly signaled by a new DCI field, e.g., a mapping field.

Figure 9:
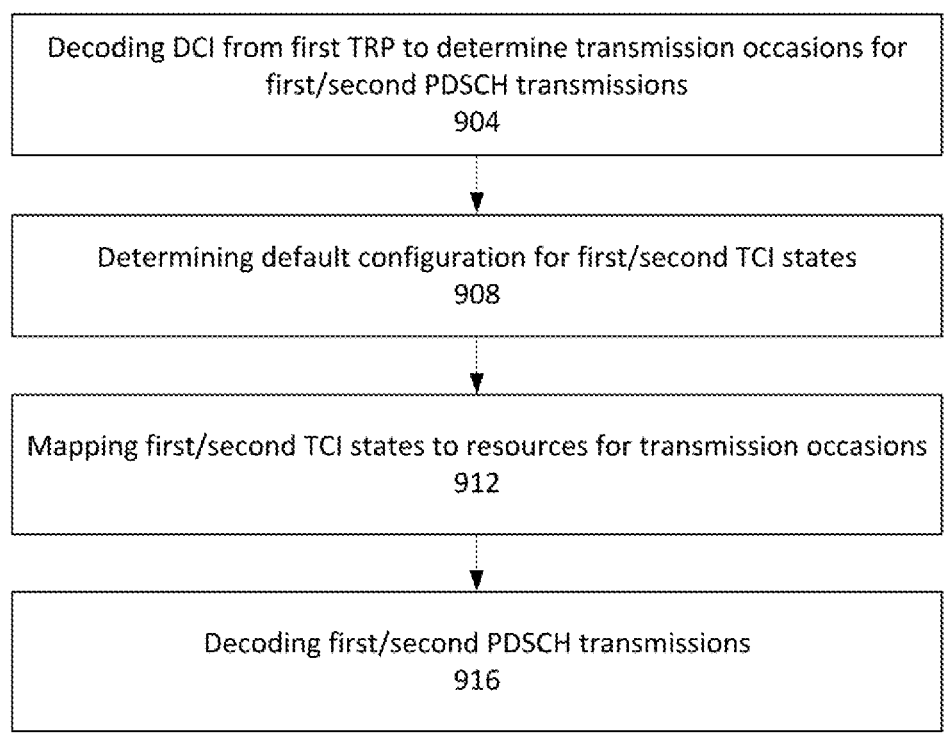
FIG. 9 illustrates an operational flow/algorithmic structure in accordance with some embodiments.

FIG. 9 may include an operation flow/algorithmic structure 900 in accordance with some embodiments. The operation flow/algorithmic structure 900 may be performed or implemented by a UE such as, for example, UE 104 or 1200; or components thereof, for example, baseband processor 1204A.

The operation flow/algorithmic structure 900 may include, at 904, decoding DCI to determine first and second PDSCH transmission occasions. The UE may determine the first and second PDSCH transmission occasions based on scheduling information included in the DCI. The DCI may be conveyed by PDCCH transmitted by one TRP, while the PDSCH transmission occasions may be to accommodate PDSCH transmissions from a plurality of TRPs. Thus, operation may be consistent with single-DCI mode using multiple TRPs.

The operation flow/algorithmic structure 900 may further include, at 908, determining a default configuration of first and second TCI states. In some embodiments, the UE may be configured with active TCI states/combinations. To determine the default configuration, the UE may identify a lowest codepoint of the activated states/combinations that includes two TCI states. With reference to FIG. 2, the lowest codepoint having two TCI states would correspond to codepoint 204. Thus, in this embodiment, the two TCI states may include TC state 1 and TCI state 2.

The operation flow/algorithmic structure 900 may further include, at 912, mapping the first and second TCI states to resources for transmission occasions. In some embodiments, the UE may be configured with a plurality of mapping options that maps to TC states to two RBG sets (in embodiments using FDM techniques) or at least one CDM group (in embodiments using SDM techniques). The UE may determine which mapping option of the plurality of mapping options to select based on a mapping indication. The mapping indication may be determined based on some combination of existing network conditions or downlink control signaling (for example, RRC signaling, MAC signaling, or DCI).

For example, in some embodiments, the UE may determine which of a plurality of mapping options to use based on explicit control signaling or contextual control signaling. An example of explicit control signaling may include a field that includes a value that maps directly to one of the mapping options. An example of contextual control signaling may include determining the selected mapping option based on aspects of control signaling, for example, whether a TCI field of the DCI or a starting CCE for the DCI corresponds to an even or odd value. In other embodiments, other contextual or implicit control signaling may be used.

The plurality of mapping options may correspond to those described with respect to FIG. 5 for an embodiment that uses RBG sets for FDM; or FIGS. 6-8 for an embodiment that uses CDM groups for SDM.

The operation flow/algorithmic structure 900 may further include, at 916, decoding first and second PDSCH transmissions. The first and second PDSCH transmissions may be received in the RBG sets or CDM groups of the first and second PDSCH transmission occasions. The decoding of the PDSCH transmissions may include determining QCL relationships between reference signals and the PDSCH transmissions as defined by the relevant TCI state. The UE may use the QCL information to facilitate the decoding of the PDSCH transmissions by correlating propagation channels that convey the data to those that convey the corresponding reference signals.

Figure 10:
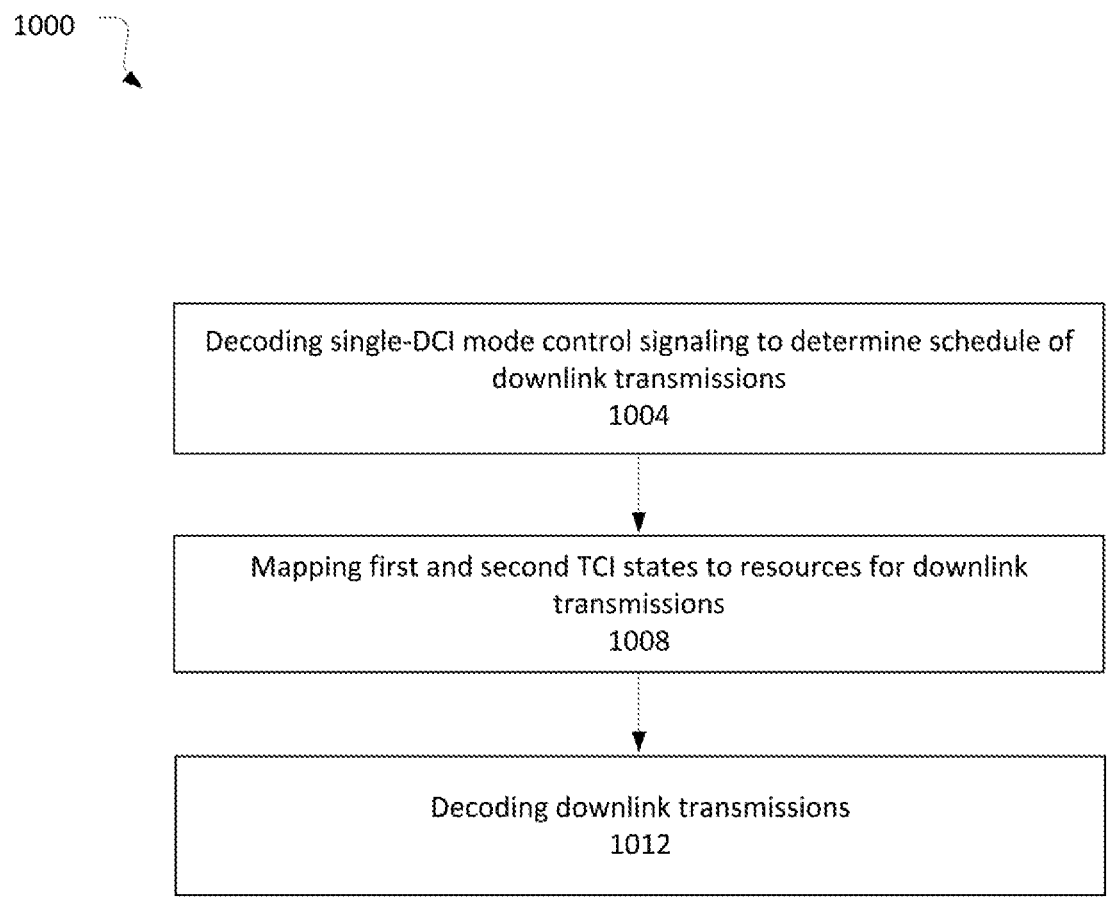
FIG. 10 illustrates an operational flow/algorithmic structure in accordance with some embodiments.

FIG. 10 may include an operation flow/algorithmic structure 1000 in accordance with some embodiments. The operation flow/algorithmic structure 1000 may be performed or implemented by a UE such as, for example, UE 104 or 1200; or components thereof, for example, baseband processor 1204A The operation flow/algorithmic structure 1000 may include, at 1004, decoding single-DCI mode control signaling to determine schedule of downlink transmissions. The control signaling may include a single DCI that schedules PDSCH transmissions from a plurality of TRPs.

The operation flow/algorithmic structure 1000 may further include, at 1008, mapping first and second TCI states to resources for downlink transmissions.

The two TC states may correspond to one codepoint in a TC field of the DCI. In some embodiments, the two TCI states may be determined as a default configuration, which may be based on activated TC states/combinations. This may be used in situations in which the UE is unable to decode the TCI field of the DCI in time to process the scheduled PDSCH transmissions based on the codepoint indicated by the TC field.

The mapping option may be selected from a plurality of mapping options based on control signaling or other network conditions. The mapping option may map the two TCI states to resources for downlink transmissions. In some embodiments, the resources may include at least two RBG sets or one or more CDM groups.

The operation flow/algorithmic structure 1000 may further include, at 1012, decoding the downlink transmissions. The downlink transmissions may be decoded similar to that described above with respect to operation 916 of operation flow/algorithmic structure 900.

Figure 11:
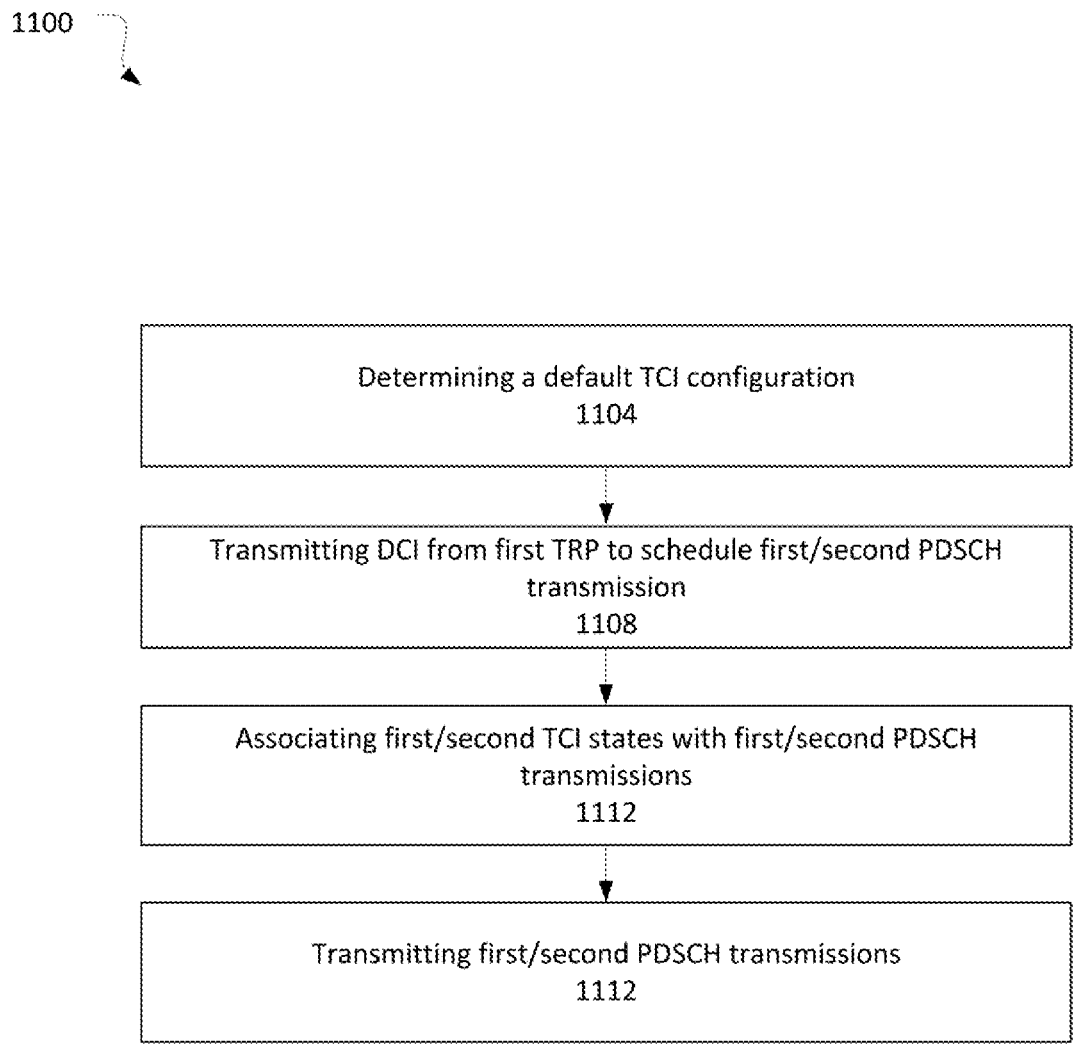
FIG. 11 illustrates an operational flow/algorithmic structure in accordance with some embodiments.

FIG. 11 may include an operation flow/algorithmic structure 1100 in accordance with some embodiments. In some embodiments, the operation flow/algorithmic structure 1100 may be performed or implemented by a base station, for example, gNB 108 or 1300; or components thereof, for example, baseband processor 1304A.

The operation flow/algorithmic structure 1100 may include, at 1104, determining a default TCI configuration. The default TCI configuration may include two TC states that correspond to one codepoint of an activated set of TC state/combinations.

The operation flow/algorithmic structure 1100 may further include, at 1108, transmitting DCI from a first TRP to schedule PDSCH transmissions from the first TRP and a second TRP. The PDSCH transmissions may be the same or different transmissions directed to one UE. In addition to the scheduling information, the DCI may include a mapping indication to instruct the UE to use a mapping option from a plurality of mapping options to map the two TC states to resources that carry the two PDSCH transmissions. In other embodiments, the mapping indication may be additionally/alternatively sent in other control signaling or preconfigured to the UE.

The operation flow/algorithmic structure 1100 may further include, at 1112, associating the first and second TC states with the first and second PDSCH transmissions. In some embodiments, the base station may encode the PDSCH transmissions on RBG sets or CDM groups in a manner to ensure the QCL relationships indicated by the TCI states that are mapped to respective resources are accurate.

The operation flow/algorithmic structure 1100 may further include, at 1116, transmitting the first and second PDSCH transmissions. The transmission of these PDSCH transmissions may include encoding the data to be transmitted in the RBG sets or CDM groups and causing transmission of the encoded data and corresponding DMRSs to facilitate demodulation of the data.

Figure 12:
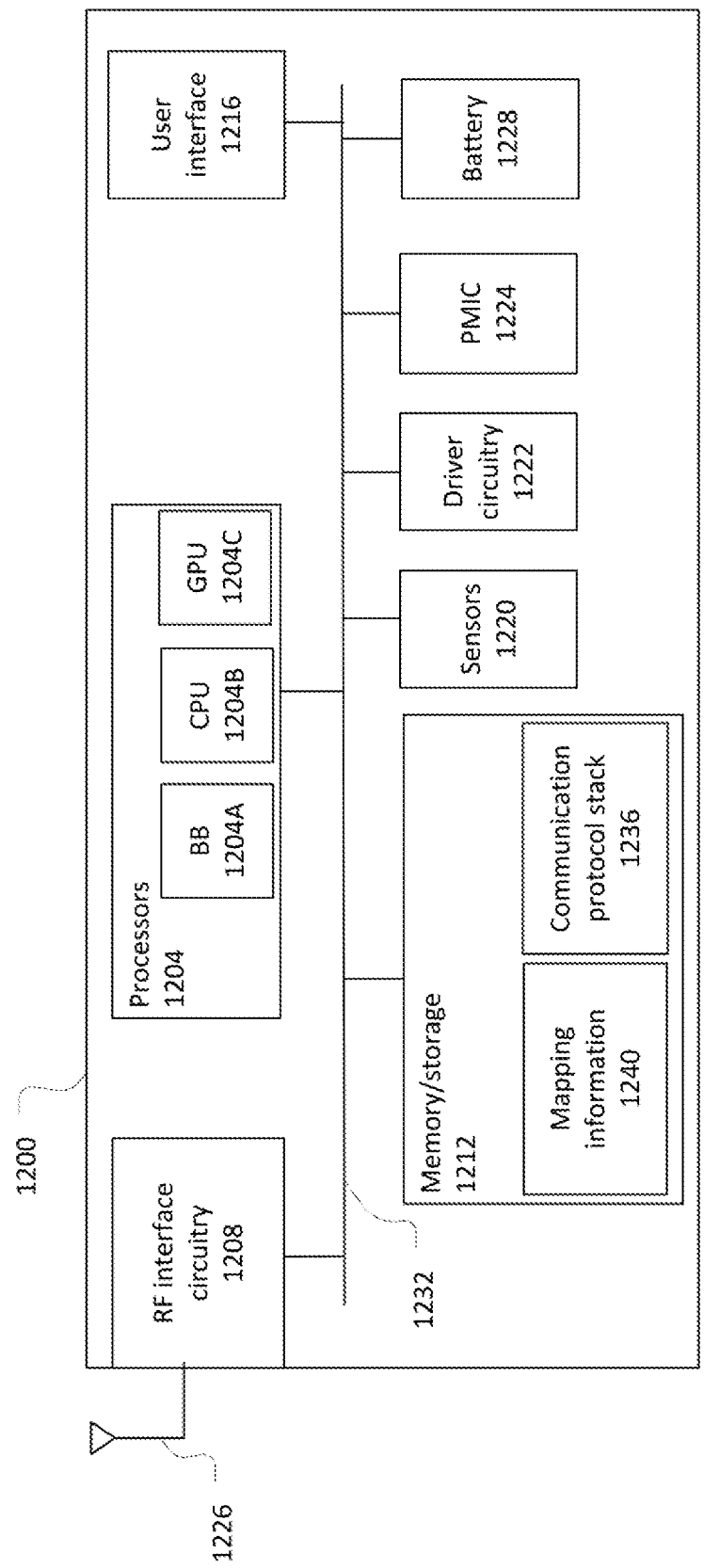
FIG. 12 illustrates a user equipment in accordance with some embodiments.

FIG. 12 illustrates a UE 1200 in accordance with some embodiments. The UE 1200 may be similar to and substantially interchangeable with UE 124 of FIG. 1.

Similar to that described above with respect to UE 124, the UE 1200 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.) video surveillance/ monitoring devices (for example, cameras, video cameras, etc.) wearable devices, relaxed-IoT devices. In some embodiments, the UE may be a RedCap UE or NR-Light UE.

The UE 1200 may include processors 1204, RF interface circuitry 1208, memory/storage 1212, user interface 1216, sensors 1220, driver circuitry 1222, power management integrated circuit "PMIC" 1224, and battery 1228. The components of the UE 1200 may be implemented as integrated circuits "ICs," portions thereof, discrete electronic devices, or other modules, logic, hardware, software, firmware, or a combination thereof. The block diagram of FIG. 12 is intended to show a high-level view of some of the components of the UE 1200. However, some of the components shown may be omitted, additional components may be present, and different arrangement of the components shown may occur in other implementations.

The components of the UE 1200 may be coupled with various other components over one or more interconnects 1232, which may represent any type of interface, input/ output, bus (local, system, or expansion), transmission line, trace, optical connection, etc. that allows various circuit components (on common or different chips or chipsets) to interact with one another.

The processors 1204 may include processor circuitry such as, for example, baseband processor circuitry "BB" 1204A, central processor unit circuitry "CPU" 1204B, and graphics processor unit circuitry "GPU" 1204C. The processors 1204 may include any type of circuitry or processor circuitry that executes or otherwise operates computer-executable instructions, such as program code, software modules, or functional processes from memory/storage 1212 to cause the UE 1200 to perform operations as described herein.

In some embodiments, the baseband processor circuitry 1204A may access a communication protocol stack 1236 in the memory/storage 1212 to communicate over a 3GPP compatible network. In general, the baseband processor circuitry 1204A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum "NAS" layer. In some embodiments, the PHY layer operations may additionally/alternatively be performed by the components of the RF interface circuitry 1208.

The baseband processor circuitry 1204A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The baseband processor circuitry 1204A may also access mapping information 1240 from memory/storage 1212 to determine which mapping option of a plurality of mapping options may be used to map TCI states to RBG sets/CDM groups used for PDSCH transmissions as described herein. In some embodiments, some or all of the mapping information may be communicated to the UE 1200 from a base station.

The memory/storage 1212 may include any type of volatile or non-volatile memory that may be distributed throughout the UE 1200. In some embodiments, some of the memory/storage 1212 may be located on the processors 1204 themselves (for example, L1 and L2 cache), while other memory/storage 1212 is external to the processors 1204 but accessible thereto via a memory interface. The memory/storage 1212 may include any suitable volatile or non-volatile memory such as, but not limited to, dynamic random access memory "DRAM," static random access memory "SRAM," erasable programmable read only memory "EPROM," electrically erasable programmable read only memory "EEPROM," Flash memory, solid-state memory, or any other type of memory device technology.

The RF interface circuitry 1208 may include transceiver circuitry and radio frequency front module "RFEM" that allows the UE 1200 to communicate with other devices over a radio access network. The RF interface circuitry 1208 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna 1226 and proceed to filter and amplify (with a low-noise amplifier) the signal. The signal may be provided to a receiver of the transceiver that down-converts the RF signal into a baseband signal that is provided to the baseband processor of the processors 1204.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1226.

In various embodiments, the RF interface circuitry 1208 may be configured to transmit/receive signals in a manner compatible with NR access technologies.

The antenna 1226 may include a number of antenna elements that each convert electrical signals into radio waves to travel through the air and to convert received radio waves into electrical signals. The antenna elements may be arranged into one or more antenna panels. The antenna 1226 may have antenna panels that are omnidirectional, directional, or a combination thereof to enable beamforming and multiple input, multiple output communications. The antenna 1226 may include microstrip antennas, printed antennas fabricated on the surface of one or more printed circuit boards, patch antennas, phased array antennas, etc. The antenna 1226 may have one or more panels designed for specific frequency bands including bands in FR1 or FR2.

The user interface circuitry 1216 includes various input/ output (I/O) devices designed to enable user interaction with the UE 1200. The user interface 1216 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1200.

The sensors 1220 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like), depth sensors, ambient light sensors, ultrasonic transceivers; microphones or other like audio capture devices; etc.

The driver circuitry 1222 may include software and hardware elements that operate to control particular devices that are embedded in the UE 1200, attached to the UE 1200, or otherwise communicatively coupled with the UE 1200. The driver circuitry 1222 may include individual drivers allowing other components to interact with or control various input/output (I/O) devices that may be present within, or connected to, the UE 1200. For example, driver circuitry 1222 may include a display driver to control and allow access to a display device, a touchscreen driver to control and allow access to a touchscreen interface, sensor drivers to obtain sensor readings of sensor circuitry 1220 and control and allow access to sensor circuitry 1220, drivers to obtain actuator positions of electro-mechanic components or control and allow access to the electro-mechanic components, a camera driver to control and allow access to an embedded image capture device, audio drivers to control and allow access to one or more audio devices.

The power management integrated circuitry "PMIC" 1224 may manage power provided to various components of the UE 1200. In particular, with respect to the processors 1204, the PMIC 1224 may control power-source selection, voltage scaling, battery charging, or DC-to-DC conversion.

In some embodiments, the PMIC 1224 may control, or otherwise be part of, various power saving mechanisms of the UE 1200. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 1200 may power down for brief intervals of time and thus save power. If there is no data traffic activity for an extended period of time, then the UE 1200 may transition off to an RRC_Idle state, where it disconnects from the network and does not perform operations such as channel quality feedback, handover, etc. The UE 1200 goes into a very low power state and it performs paging where again it periodically wakes up to listen to the network and then powers down again. The UE 1200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1228 may power the UE 1200, although in some examples the UE 1200 may be mounted deployed in a fixed location, and may have a power supply coupled to an electrical grid. The battery 1228 may be a lithium ion battery, a metal-air battery, such as a zinc-air battery, an aluminum-air battery, a lithium-air battery, and the like. In some implementations, such as in vehicle-based applications, the battery 1228 may be a typical lead-acid automotive battery.

Figure 13:
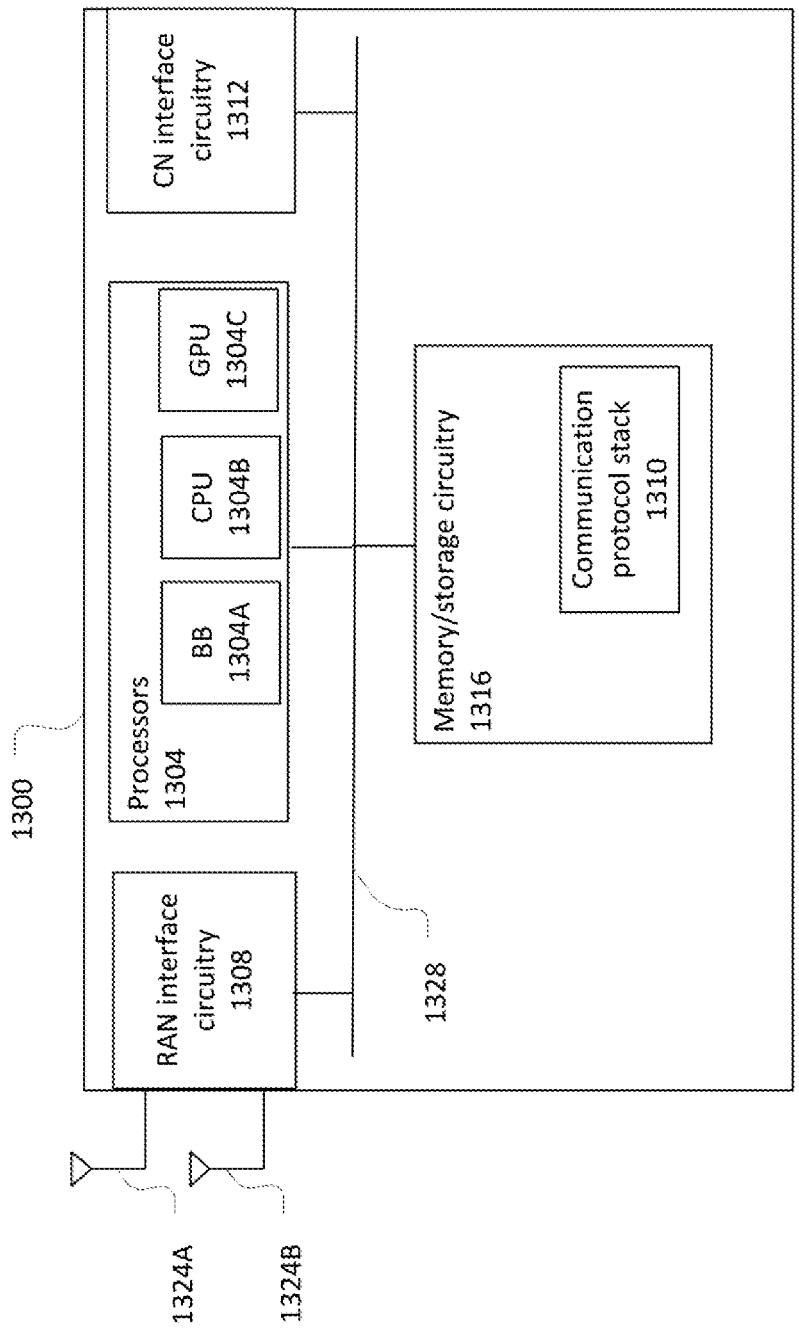
FIG. 13 illustrates a gNB in accordance with some embodiments.

FIG. 13 illustrates a gNB 1300 in accordance with some embodiments. The gNB node 1300 may similar to and substantially interchangeable with gNB 138.

The gNB 1300 may include processors 1304, RF interface circuitry 1308, core network "CN" interface circuitry 1312, and memory/storage circuitry 1316.

The components of the gNB 1300 may be coupled with various other components over one or more interconnects 1328.

The processors 1304, RF interface circuitry 1308, memory/storage circuitry 1316 (including communication protocol stack 1310, and interconnects 1328 may be similar to like-named elements shown and described with respect to FIG. 12.

The CN interface circuitry 1312 may provide connectivity to a core network, for example, a $5^{th}$ Generation Core network "5GC" using a 5GC-compatible network interface protocol such as carrier Ethernet protocols, or some other suitable protocol. Network connectivity may be provided to/from the gNB 1300 via a fiber optic or wireless backhaul. The CN interface circuitry 1312 may include one or more dedicated processors or FPGAs to communicate using one or more of the aforementioned protocols. In some implementations, the CN interface circuitry 1312 may include multiple controllers to provide connectivity to other networks using the same or different protocols.

The gNB 1300 may include a first TRP 1324A and a second TRP 1324B. The TRPs 1324 may include antennas or antenna panels similar to that described above with respect to antenna 1226 of the UE 1200. In some embodiments, the TRPs 1324 may additionally have at least some components to provide PHY layer processing. These components include, but are not limited to, filters, mixers, oscillators, analog beamforming components, etc.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include a method of operating a UE, the method comprising the coding downlink control information "DCI," from a first transmit and receive point "TRP," to determine a first physical downlink shared channel "PDSCH" transmission occasion for a first PDSCH transmission from the first TRP, and a second PDSCH transmission occasion for a second PDSCH transmission from a second TRP; determining, as a default configuration when a scheduling offset is below a threshold reported by the UE, a first transmission configuration indicator "TCI" state and a second TC state, wherein both the first and second TCI states correspond to one codepoint in a TCI field of the DCI; mapping the first and second TCI states to resources for the first and second PDSCH transmission occasions; and decoding the first PDSCH transmission and the second PDSCH transmission based on the mapping of the first and second TCI states to resources for the first and second PDSCH transmission occasions.

Example 2 may include the method of example 1 or some other example herein, wherein the resources for the first PDSCH transmission occasion correspond to a first resource block group "RBG" set and resources for the second PDSCH transmission occasion correspond to a second RBG set.

Example 3 may include the method of example 2 or some other example herein, wherein a first mapping option is to map the first TCI state to the first RBG set and map the second TCI state to the second RBG set, a second mapping option is to map the first TCI state to the second RBG set and map the second TCI state to the first RBG set, and the method further comprises: processing a radio resource control signal or media access control signal to determine a mapping indication; selecting a mapping option from the first and second mapping options based on the mapping indication; and mapping the first and second TC states to the first and second RBG sets based on the mapping option selected from the first and second mapping options.

Example 4 includes a method of example 2 or some other example herein, wherein a first mapping option is to map the first TCI state to the first RBG set and map the second TCI state to the second RBG set, a second mapping option is to map the first TCI state to the second RBG set and map the second TCI state to the first RBG set, and the method further comprises: selecting a mapping option from the first and second mapping options based on a slot, subframe, or frame index of a reference transmission; and mapping the first and second TCI states to the first and second RBG sets based on the mapping option selected from the first and second mapping options.

Example 5 includes a method of example 2 or some other example herein, wherein a first mapping option is to map the first TC state to the first RBG set and map the second TCI state to the second RBG set, a second mapping option is to map the first TCI state to the second RBG set and map the second TCI state to the first RBG set, and the method further comprises: selecting a mapping option from the first and second mapping options based on the DCI; and mapping the first and second TCI states to the first and second RBG sets based on the mapping option selected from the first and second mapping options.

Example 6 may include the method of example 5 or some other example herein, wherein selecting the mapping option based on the DCI comprises detecting a first value in the TCI field and select the mapping option based on whether the first value is odd or even; or detecting a second value in a mapping field and select the mapping option based on an explicit indication provided by the second value.

Example 7 may include the method of example 5 or some other example herein, wherein selecting the mapping option based on the DCI comprises determining a starting control channel element "CCE" index that carries the DCI; and select the mapping option based on the starting CCE index.

Example 8 may include the method of example 1 or some other example herein, wherein the resources for the first and second PDSCH transmission occasions correspond to one or more code-division multiplexing "CDM" groups.

Example 9 may include the method of example 8 or some other example herein, further comprising: processing a control signal to determine a mapping indication, the control signal to include a radio resource control signal, a media access control signal, or a downlink control information signal; selecting a mapping option from a plurality of mapping options that map the first and second TCI states to the one or more CDM groups based on the mapping indication; and mapping the first and second TCI states to the one or more CDM groups based on the mapping option selected from the plurality of mapping options.

Example 10 may include a method of operating a UE, the method comprising: storing mapping information; decoding single-downlink control information "DCI" mode control signaling to determine schedule of downlink transmissions from a plurality of transmit and receive points "TRPs"; mapping, based on the mapping information, first and second transmission configuration indicator "TCI" states to resources for the downlink transmissions, the resources to include at least two resource block group "RBG" sets or one or more code-division multiplexing "CDM" groups; and decoding the downlink transmissions based on the mapping of the first and second TCI states to the resources for the downlink transmissions.

Example 11 may include the method of example 10 or some other example herein, wherein the resources include one or more CDM groups and the method further comprises: selecting a mapping option from a plurality of mapping options that map the first and second TCI states to the one or more CDM groups based on the mapping information; and mapping the first and second TC states to the one or more CDM groups based on the mapping option selected from the plurality of mapping options.

Example 12 may include the method of example 11 or some other example herein, wherein the one or more CDM groups comprise one CDM group and the plurality of mapping options include: a first mapping option to map the first TC state to the one CDM group; a second mapping option to map the second TCI state to the one CDM group; and a third mapping option to map both the first and second TC states to the one CDM group.

Example 13 may include the method of example 11 or some other example herein, wherein the one or more CDM groups comprise two CDM groups and the plurality of mapping options include: a first mapping option to map the first TCI state to a first CDM group of the two CDM groups and the second TCI state to a second CDM group of the two CDM groups; a second mapping option to map the second TC state to the first CDM group and the first TCI state to the second CDM group; and a third mapping option to map both the first and second TCI states to both the first and second CDM groups.

Example 14 may include the method of example 11 or some other example herein, wherein the one or more CDM groups comprise three CDM groups and the plurality of mapping options include: a first mapping option to map the first TC state to a first CDM group of the two CDM groups and the second TCI state to a second or third CDM group of the two CDM groups; a second mapping option to map the first TCI state to the second CDM group and the second TCI state to the first or third CDM group; a third mapping option to map the first TCI state to the third CDM group and the second TC state to the first or second CDM group; a fourth mapping option to map the second TCI state to the first CDM group and the first TCI state to the second or third CDM group; a fifth option to map the second TC state to the second CDM group and the first TCI state to the first or third CDM group; a sixth option to map the second TCI state to the third CDM group and the first TC state to the first or second CDM group; and a seventh mapping option to map both the first and second TCI states to both the first CDM group and the second or third CDM group.

Example 15 may include the method of example 10 or some other example herein, further comprising determining the mapping information based on control signaling that includes a radio resource control "RRC" signal, a media access control signal, or a downlink control information "DCI" signal.

Example 16 may include the method of example 15 or some other example herein, wherein the control signaling includes the RRC signal to indicate that the UE is to apply one or two TCI states; and, if the RRC signal indicates the UE to is apply one TCI state, the control signaling further includes the DCI signal to indicate a specific mapping option from a plurality of single-TCI state mapping options.

Example 17 may include a method of operating a base station comprising: determining a default transmission configuration indicator "TCI" configuration that includes a first TC state and a second TC state; transmitting, from a first transmit and receive point "TRP" to a user equipment "UE," downlink control information "DCI" to schedule a first physical downlink shared channel "PDSCH" transmission from the first TRP and a second PDSCH transmission from a second TRP, associating, based on mapping information, the first or second TCI state with the first or second PDSCH transmissions; and transmitting the first and second PDSCH transmissions.

Example 18 may include the method of example 17 or some other example herein, wherein transmitting the first and second PDSCH transmissions comprises: transmitting the first and second PDSCH transmissions using one or more code-division multiplexing "CDM" groups, wherein the mapping information is to associate the first or second TCI state to the one or more CDM groups.

Example 19 may include the method of example 17 or some other example herein, wherein transmitting the first and second PDSCH transmissions comprises: transmitting the first and second PDSCH transmissions using at least two resource block group "RBG" sets, wherein the mapping information is to associate the first or second TC state to the at least two RBG sets.

Example 20 may include the method of example 17 or some other example herein, further comprising: transmitting, to the UE in control signaling, an indication of the mapping information, wherein the control signaling includes radio resource to the UE using radio resource control signaling, media access control signaling, or downlink control information Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-64, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications w % ill become apparent to those skilled in the art once the above disclosure is fully appreciated. It is intended that the following claims be interpreted to embrace all such variations and modifications.

What is claimed is:

1. One or more non-transitory computer-readable storage media having instructions that, when executed, cause processing circuitry to:
    decode downlink control information (DCI), from a first transmit and receive point (TRP), to determine a first physical downlink shared channel (PDSCH) transmission occasion for a first PDSCH transmission from the first TRP, and a second PDSCH transmission occasion for a second PDSCH transmission from a second TRP, wherein the first PDSCH transmission occasion corresponds to a first resource block group (RBG) set and the second PDSCH transmission occasion corresponds to a second RBG set;
    determine, as a default configuration when a scheduling offset is below a threshold reported by a user equipment (UE), a first transmission configuration indicator (TCI) state and a second TCI state, wherein both the first and second TCI states correspond to one codepoint in a TCI field of the DCI;
    select a mapping option from a first mapping option and a second mapping option based on a slot, subframe, or frame index of a reference transmission, wherein the first mapping option is to map the first TCI state to the first RBG set and map the second TCI state to the second RBG set and the second mapping option is to map the first TCI state to the second RBG set and map the second TCI state to the first RBG set;
    map the first and second TCI states to the first and second RBG sets based on the mapping option; and
    decode the first PDSCH transmission and the second PDSCH transmission based on the first and second TCI states as mapped to the first and second RBG sets.

2. The one or more non-transitory computer-readable media of claim 1, wherein the second mapping option is selected as the mapping option.

3. The one or more non-transitory computer-readable media of claim 1, wherein the processing circuitry is further to:
    select the mapping option based on a slot of the reference transmission.

4. The one or more non-transitory computer-readable media of claim 1, wherein the processing circuitry is further to:
    select the mapping option based on a subframe of the reference transmission.

5. The one or more non-transitory computer-readable media of claim 1, wherein the processing circuitry is further to: select the mapping option based on a frame index of the reference transmission.

6. One or more non-transitory, computer-readable media having instructions that, when executed, cause processing circuitry to:
    decode downlink control information (DCI), from a first transmit and receive point (TRP), to determine a first physical downlink shared channel (PDSCH) transmission occasion for a first PDSCH transmission from the first TRP, and a second PDSCH transmission occasion for a second PDSCH transmission from a second TRP, wherein the first PDSCH transmission occasion corresponds to a first resource block group (RBG) set and the second PDSCH transmission occasion corresponds to a second RBG set;
    determine, as a default configuration when a scheduling offset is below a threshold reported by a user equipment (UE), a first transmission configuration indicator (TCI) state and a second TCI state, wherein both the first and second TCI states correspond to one codepoint in a TCI field of the DCI;
    determine a starting control channel element (CCE) index that carries the DCI;
    select a mapping option from a first mapping option and a second mapping option based on the starting CCE index, wherein the first mapping option is to map the first TCI state to the first RBG set and map the second TCI state to the second RBG set and the second mapping option is to map the first TCI state to the second RBG set and map the second TCI state to the first RBG set;
    map the first and second TCI states to the first and second RBG sets based on the mapping option; and
    decode the first PDSCH transmission and the second PDSCH transmission based on the first and second TCI states as mapped to the first and second RBG sets.

7. A method comprising:
    decoding downlink control information (DCI), from a first transmit and receive point (TRP), to determine a first physical downlink shared channel (PDSCH) transmission occasion for a first PDSCH transmission from the first TRP, and a second PDSCH transmission occasion for a second PDSCH transmission from a second TRP, wherein the first PDSCH transmission occasion corresponds to a first resource block group (RBG) set and the second PDSCH transmission occasion corresponds to a second RBG set;
    determining, as a default configuration when a scheduling offset is below a threshold reported by a user equipment (UE), a first transmission configuration indicator (TCI) state and a second TCI state, wherein both the first and second TCI states correspond to one codepoint in a TCI field of the DCI;
    selecting a mapping option from a first mapping option and a second mapping option based on a slot, subframe, or frame index of a reference transmission, wherein the first mapping option is to map the first TCI state to the first RBG set and map the second TCI state to the second RBG set and the second mapping option is to map the first TCI state to the second RBG set and map the second TCI state to the first RBG set;
    mapping the first and second TCI states to the first and second RBG sets based on the mapping option; and
    decoding the first PDSCH transmission and the second PDSCH transmission based on the first and second TCI states as mapped to the first and second RBG sets.

8. The method of claim 7, wherein the second mapping option is selected as the mapping option.

9. The method of claim 7, further comprising:
selecting the mapping option based on a slot of the reference transmission.

10. The method of claim 7, further comprising:
selecting the mapping option based on a subframe of the reference transmission.

11. The method of claim 7, further comprising:
selecting the mapping option based on a frame index of the reference transmission.

\* \* \* \* \*